United States Patent
Xie et al.

(10) Patent No.: US 12,338,372 B2
(45) Date of Patent: Jun. 24, 2025

(54) GREEN, SAFE AND ENVIRONMENTALLY-FRIENDLY PROCESS AND PRODUCTION EQUIPMENT FOR INDUSTRIALIZED CONTINUOUS LARGE-SCALE PRODUCTION OF FORMALDEHYDE-FREE WATER-BASED ADHESIVE

(71) Applicants: New Era Chemical Shan Dong Co., Ltd., Weihai (CN); Weihai New Era New Material Co., Ltd., Weihai (CN)

(72) Inventors: Lefu Xie, Weihai (CN); Junqiang Shao, Weihai (CN); Xiaoliang Miao, Weihai (CN); Xiaomin Liu, Weihai (CN); Fei Cong, Weihai (CN); Jianmin Zhou, Weihai (CN); Weijie Zhao, Weihai (CN)

(73) Assignees: New Era Chemical Shan Dong Co., Ltd., Weihai (CN); Weihai New Era New Material Co., Ltd., Weihai (CN)

( * ) Notice: Subject to any disclaimer, the term of this patent is extended or adjusted under 35 U.S.C. 154(b) by 335 days.

(21) Appl. No.: 18/049,739

(22) Filed: Oct. 26, 2022

(65) Prior Publication Data
US 2023/0138786 A1 May 4, 2023

(51) Int. Cl.
| | | |
|---|---|---|
| C09J 135/00 | (2006.01) |
| C08F 2/01 | (2006.01) |
| C08F 2/06 | (2006.01) |
| C08F 2/38 | (2006.01) |
| C08F 22/06 | (2006.01) |

(52) U.S. Cl.
CPC .............. *C09J 135/00* (2013.01); *C08F 2/01* (2013.01); *C08F 2/06* (2013.01); *C08F 2/38* (2013.01); *C08F 22/06* (2013.01)

(58) Field of Classification Search
CPC ...... C08F 4/34; C08F 2/01; C08F 2/06; C08F 2/38; C08F 8/12; C08F 8/32; C08F 22/06; C08F 222/06; C08F 212/08; C08F 212/36; C09J 135/00
USPC ...................................................... 156/326
See application file for complete search history.

(56) References Cited

U.S. PATENT DOCUMENTS 11,926,770 B2 * 3/2024 Zhang ................... C08F 220/06

* cited by examiner

*Primary Examiner* — James D Sells
(74) *Attorney, Agent, or Firm* — CBM PATENT CONSULTING, LLC

(57) ABSTRACT

A green, safe and environmentally-friendly process and production equipment for industrialized continuous large-scale production of a formaldehyde-free water-based adhesive; the process includes: performing a polymerization reaction on a monomer having a carbon-carbon unsaturated double bond and an acid anhydride group and at least one other monomer containing a carbon-carbon unsaturated double bond that serve as raw materials in the presence of a solvent and an initiator; and performing solid-liquid separation on the polymerization reaction solution under the action of a high-temperature inert carrier gas, vaporizing, condensing, and recovering the solvent for indiscriminate use in polymerization reaction, and performing a gas-solid reaction on the solid material serving as a polymer intermediate and a mixed gas of ammonia gas and air to obtain a solid formaldehyde-free water-based adhesive product.

20 Claims, 1 Drawing Sheet

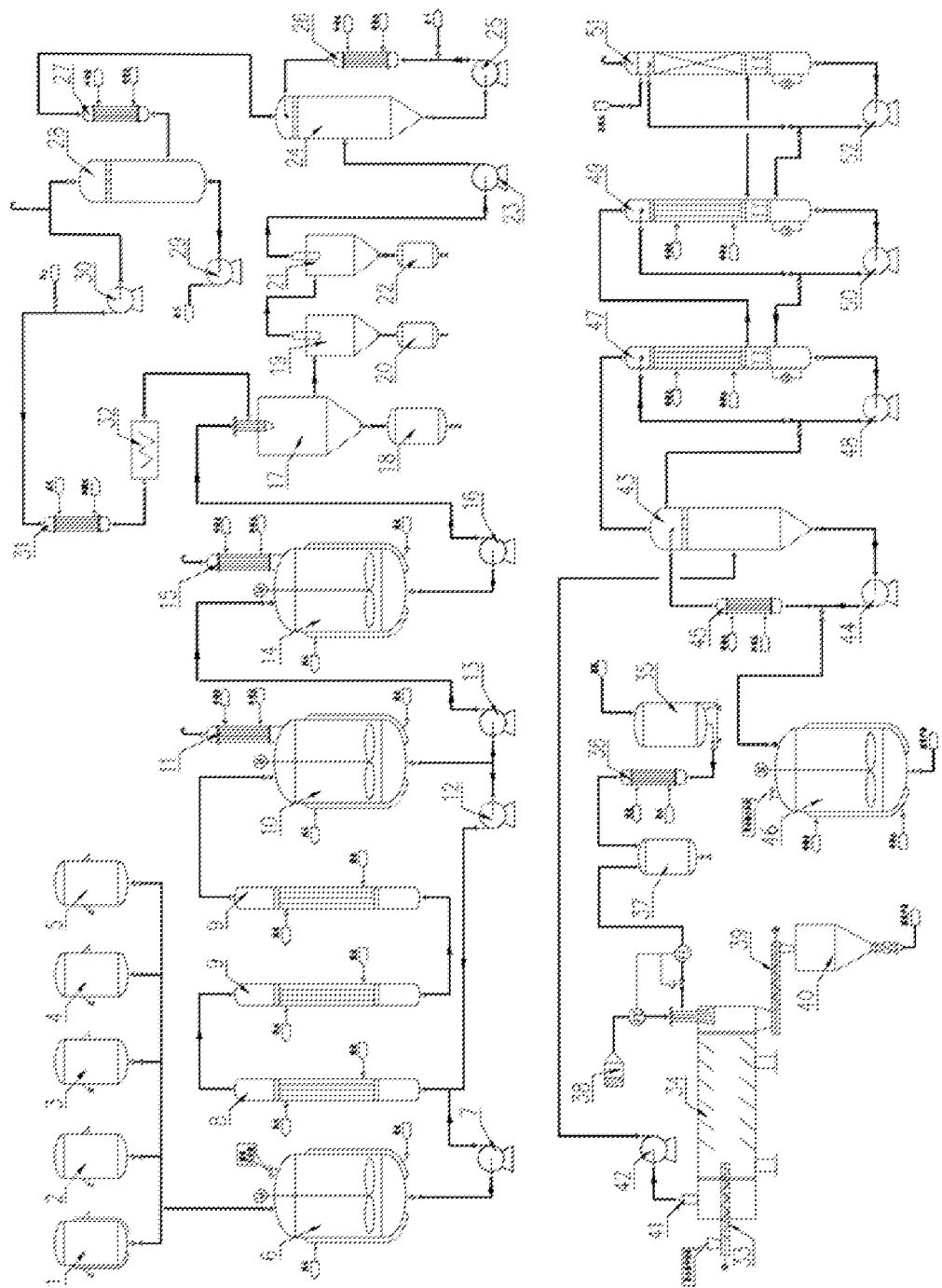

GREEN, SAFE AND ENVIRONMENTALLY-FRIENDLY PROCESS AND PRODUCTION EQUIPMENT FOR INDUSTRIALIZED CONTINUOUS LARGE-SCALE PRODUCTION OF FORMALDEHYDE-FREE WATER-BASED ADHESIVE

CROSS REFERENCES

This application claims priority to Chinese Patent Application Ser. Nos. 202111271708.7 and 202111273437.9 filed on 29 Oct. 2021.

FIELD OF THE INVENTION

The present invention relates to the technical field of adhesives for wood-based panels, and specifically, to a green, safe and environmentally-friendly process and production equipment for industrialized continuous large-scale production of a formaldehyde-free water-based adhesive.

BACKGROUND OF THE INVENTION

In the current production process of wood-based panels, "three aldehyde glues" (urea resin, phenolic resin, and melamine formaldehyde resin) prepared from formaldehyde occupy a larger proportion, more than 80%. Panels using the "three aldehyde glues" will emit free formaldehyde for a long term, which pollutes the indoor environment and seriously threatens the health of residents. With the improvement of people's living standards, the green and ecological consumption concept is increasingly recognized, and more and more attention has been paid to the environmental protection and health of the home environment. The formaldehyde emission of panel products has become a problem of great concern to consumers, and only decoration materials satisfying higher environmental protection standards can become the mainstream of the market. Formaldehyde Emission Grading for Wood-based Panel and Finishing Products (GB/T 39600-2021) and A Guide to the Limited Quantity in Indoor Loading for Wood-based Panel Based on Its Ultimate Formaldehyde Emission (GB/T39598-2021) that are jointly issued by China National Administration for Market Regulation and China Standardization Administration come into effect on Oct. 1, 2021, and provide new regulations and guidelines of formaldehyde emission grading and indoor loading for wood-based panels, in which the newly proposed standard of ENF grade ≤0.025 $mg/m^3$ is known as "the strictest formaldehyde standard in history".

Adhesives prepared from biomass raw materials such as soy protein, tannin, starch, and gelatin do not involve the use of formaldehyde, but the quick degradation of biomass raw materials poses the problem of easy aging of panels. Although the degradation can be delayed to a certain extent by adding anti-aging agents, biomass material-based adhesives still have high cost and resource problems, which also limit their practical use. In addition, panels can be produced using polymers such as polyvinyl chloride, high-molecular-weight polyethylene, and neoprene, but these polymers are not water-soluble and cannot form water-based adhesives. The polymers can be mixed with wood raw materials by hot melting or organic solvents only, which is still costly, energy-consuming and environmentally unfriendly. CN112852357A proposes use of a copolymer-based adhesive in production of a panel, the copolymer has a repeating unit having an amide group and a carboxyl group and/or an ammonium salt thereof, and the panel has the characteristics of no formaldehyde emission, low cost, simple and convenient application, and excellent properties. However, in the preparation process of the polymer, the use of solvent precipitation combined with centrifugal separation or filtering separation produces a large amount of solid-liquid mixed solvent, which is stressful for separation and recovery. Meanwhile, a centrifuged or filtered mother solution contains a considerable proportion of low-molecular-weight polymer that cannot be reused, resulting in the production of a large amount of hazardous waste, which is not in line with the reaction principle of atom economy and the green chemistry production goal. Therefore, the preparation process is not suitable for industrialized continuous large-scale production.

Based on the above, it is urgent to develop a green, safe and environmentally-friendly production process for industrialized continuous large-scale production of a formaldehyde-free water-based adhesive that is simple and has mild reaction conditions and good atom economy.

SUMMARY OF THE INVENTION

In view of the deficiencies of the prior art, especially the problem that the current preparation process of a formaldehyde-free water-based adhesive may not realize high-atom-economy, green, safe and environmentally-friendly large-scale production, a first objective of the present invention is to provide a green, safe and environmentally-friendly production process for industrialized continuous large-scale production of a formaldehyde-free water-based adhesive that is simple and has mild reaction conditions and good atom economy.

Technical Solutions of the Present Invention are as Follows:

A green, safe and environmentally-friendly production process of a formaldehyde-free water-based adhesive includes:
  performing a polymerization reaction on a monomer having a carbon-carbon unsaturated double bond and an acid anhydride group and at least one other monomer containing a carbon-carbon unsaturated double bond that serve as raw materials in the presence of a solvent and an initiator; and
  performing solid-liquid separation on the polymerization reaction solution under the action of a high-temperature inert carrier gas, vaporizing, condensing, and recovering the solvent for indiscriminate use in polymerization reaction, and performing a gas-solid reaction on the solid material serving as a polymer intermediate and a mixed gas of ammonia gas and air to obtain a solid formaldehyde-free water-based adhesive product.

According to the present invention, preferably, the polymerization reaction is performed in a tubular reactor, and further preferably, in a tubular reactor in a circulation loop.

According to the present invention, preferably, the solid-liquid separation is performed by spray drying.

According to the present invention, preferably, the inert carrier gas is $N_2$ or $CO_2$.

According to the present invention, preferably, the temperature of the high-temperature inert carrier gas is 150-200° C.

According to the present invention, preferably, during the gas-solid reaction performed on the solid material serving as a polymer intermediate and the mixed gas of ammonia gas and air, the concentration of the ammonia gas is less than or equal to 25% of the lower explosive limit; and preferably, the concentration of the ammonia gas is 1-4 vol %, and further preferably, 2-3 vol %.

According to the present invention, preferably, after the gas-solid reaction is completed, unreacted ammonia gas is absorbed with water, and a liquid-solid reaction is performed on obtained ammonia water and the polymer intermediate to produce a liquid formaldehyde-free water-based adhesive product; and preferably, the concentration of the ammonia water obtained by absorbing the unreacted ammonia gas with water is 1-10 wt %, and further preferably, 3-6 wt %.

According to the present invention, preferably, the monomer having a carbon-carbon unsaturated double bond and an acid anhydride group is monolene unsaturated dicarboxylic anhydride having 4 to 8 carbon atoms, and further preferably, maleic anhydride;

preferably, the other monomer containing a carbon-carbon unsaturated double bond is a diene monomer and/or monolene containing a benzene ring; and further preferably, the diene monomer is at least one of divinylbenzene and dicyclopentadiene, and the monolene containing a benzene ring is styrene; and the most preferably, the monomer having a carbon-carbon unsaturated double bond and an acid anhydride group, the diene monomer, and the monolene containing a benzene ring are used as reaction raw materials.

According to the present invention, preferably, the solvent is an ester solvent, and further preferably, at least one of isopropyl acetate, isoamyl acetate, and ethyl butyrate.

According to the present invention, preferably, the initiator is a peroxide initiator, and further preferably, dibenzoyl peroxide.

According to the present invention, preferably, a molar ratio of the monomer having a carbon-carbon unsaturated double bond and an acid anhydride group to the at least one other monomer containing a carbon-carbon unsaturated double bond is 1:(0.1-2); and further preferably, in a case that the monomer having a carbon-carbon unsaturated double bond and an acid anhydride group, a diene monomer, and monolene containing a benzene ring are used as reaction raw materials, a molar ratio of the monomer having a carbon-carbon unsaturated double bond and an acid anhydride group to the diene monomer to the monolene containing a benzene ring is 1:(0.1-1):(0.1-1).

According to the present invention, preferably, a mass ratio of the solvent to the monomer having a carbon-carbon unsaturated double bond and an acid anhydride group is (1-10):1.

According to the present invention, preferably, an addition amount of the initiator is 0.5-3% of the mass of the reaction raw materials.

According to the present invention, a preferred embodiment of the green, safe and environmentally-friendly production process of a formaldehyde-free water-based adhesive includes the following steps:

(1) Polymerization Reaction mixing maleic anhydride, styrene, a diene monomer, a solvent, and dibenzoyl peroxide serving as an initiator, heating to dissolve the reaction raw materials, performing a polymerization reaction at 60-100° C. after the reaction raw materials are completely dissolved, and allowing the polymerization reaction solution to enter a solvent recovery system after the reaction is completed;

(2) Solvent Recovery performing solid-liquid separation on the polymerization reaction solution under the action of a high-temperature inert carrier gas, vaporizing, condensing, and recovering the solvent for indiscriminate use in polymerization reaction, and performing an ammonization reaction on the solid material serving as a polymer intermediate;

(3) Ammonization Reaction injecting ammonia gas and air in a ratio into an ammonization reactor, and performing a gas-solid reaction on the polymer intermediate and the mixed gas to obtain a solid formaldehyde-free water-based adhesive product.

A second objective of the present invention is to provide green, safe and environmentally-friendly production equipment for industrialized continuous large-scale production of a formaldehyde-free water-based adhesive.

The green, safe and environmentally-friendly production equipment for industrialized continuous large-scale production of a formaldehyde-free water-based adhesive includes a polymerization reaction system, a solvent recovery system, and an ammonization reaction system.

The polymerization reaction system includes raw material measuring tanks that are connected with a tubular reactor through a dissolving and mixing kettle.

The solvent recovery system includes a spray drying tower, the tubular reactor is connected with the spray drying tower through a charging kettle; the top of the spray drying tower is connected with a gas-liquid separator through an electrical heater and a steam heater, the bottom of the spray drying tower is connected with a spray drying tower receiving tank; the steam heater is also connected with an inert carrier gas pipeline, and the bottom of the gas-liquid separator is connected with the raw material measuring tanks for circular indiscriminate use of a solvent.

The ammonization reaction system includes a gas-solid rotary reactor provided with a charging screw, the spray drying tower receiving tank is connected with the charging screw, the gas-solid rotary reactor is connected with an air filter and a liquid ammonia measuring tank, respectively; the gas-solid rotary reactor is also provided with a discharging screw that is connected with a product tank; the gas-solid rotary reactor is also connected with a spray tower through a dust removal filter and an exhaust fan, the bottom of the spray tower is connected with the top of the spray tower through a spray tower circulating pump and a spray tower heat exchanger, and the spray tower circulating pump is connected with a liquid adhesive reaction kettle.

According to the present invention, unreacted ammonia gas in the gas-solid rotary reactor can be fully absorbed by spraying, and then reacts with a polymer intermediate in the liquid adhesive reaction kettle to obtain a liquid formaldehyde-free water-based adhesive product. A solid adhesive product can also be directly outputted by the discharging screw of the gas-solid rotary reactor.

According to the present invention, preferably, in the polymerization reaction system, the raw material measuring tanks include a maleic anhydride measuring tank, a styrene measuring tank, a diene monomer measuring tank, a solvent measuring tank, and a recovered solvent tank that are respectively connected with the dissolving and mixing kettle.

According to the present invention, preferably, in the polymerization reaction system, the dissolving and mixing kettle is connected with the tubular reactor through a charging pump and a preheater, respectively. The preheater is configured to preheat mixed raw materials in the dissolving and mixing kettle, which is more conducive to polymerization reaction.

According to the present invention, preferably, the tubular reactor is arranged by connecting 2- to 10-stage tubular reactors in series. Multi-stage tubular reactors are connected in series, which is conducive to extension of the reaction residence time and is more conducive to full polymerization.

According to the present invention, preferably, the tubular reactor is connected with the charging kettle through a curing kettle. According to the present invention, the polymerization reaction is controlled by the tubular reactor to solve the problems of excessively high reaction speed in the initiating stage of the polymerization reaction, excessively high polymerization temperature, and difficult in-time removal of reaction heat, thereby avoiding explosive polymerization caused by overtemperature runaway of the polymerization reaction temperature and product quality and safety issues caused by explosive polymerization. After rapidly reacting in the tubular reactor, materials are transferred to the curing kettle in which a molecular weight and a polymerization conversion rate of a polymer are further increased by increasing the polymerization residence time and raising the polymerization temperature, which is conducive to improvement of degree of crosslinking of a polymer intermediate and improvement of adhesive properties of an adhesive product.

According to the present invention, preferably, the curing kettle is also connected with the preheater through a circulating pump, and thus the preheater, the tubular reactor, the curing kettle, and the circulating pump form a circular polymerization reaction loop, which is further conducive to full polymerization reaction and effective removal of reaction heat at the same time;

preferably, the curing kettle is connected with the charging kettle through a discharging pump; and preferably, an upper part of the curing kettle is provided with a curing kettle condenser, and an upper part of the charging kettle is provided with a charging kettle condenser.

According to the present invention, preferably, in the solvent recovery system, the charging kettle is connected with the spray drying tower through a measuring pump;

preferably, the spray drying tower is connected with the gas-liquid separator through a primary cyclone separator, a secondary cyclone separator, an induced draft fan, a spray washing tower, and a condenser, and the gas-liquid separator is connected with the steam heater through an air blower; according to such an arrangement, solid particles can be separated from vaporized components (mainly a solvent) and an inert carrier gas carrying a small amount of dust in the spray drying tower by primary cyclone separation and secondary cyclone separation in sequence;

preferably, the primary cyclone separator and the secondary cyclone separator are respectively connected with a primary cyclone separator receiving tank and a secondary cyclone separator receiving tank that are configured to receive cyclone-separated solid particles; and preferably, the bottom of the spray washing tower is also connected with the top of the spray washing tower through a spray washing tower circulating pump and a spray washing tower heat exchanger, the spray washing tower circulating pump is also connected with the solvent measuring tank; a cyclone-separated gas is conveyed by the induced draft fan to the spray washing tower for spray washing, a recovered solvent can be used as a spray washing solution, a partial washing condensate is outputted by the spray washing tower circulating pump to the solvent measuring tank for circular indiscriminate use, and the residual gas enters the gas-liquid separator for gas-liquid separation after being condensed by circulating water in the condenser.

According to the present invention, preferably, in the ammonization reaction system, the spray tower is also connected with a water adsorption tower through a primary falling film absorption tower and a secondary falling film absorption tower; the primary falling film absorption tower is provided with a primary ammonia water pump, and the secondary falling film absorption tower is provided with a secondary ammonia water pump for circulating absorption.

According to the present invention, preferably, in the ammonization reaction system, the liquid ammonia measuring tank is connected with the gas-solid rotary reactor through a liquid ammonia evaporator and a liquid ammonia buffer tank; according to such an arrangement, ammonia gas can be mixed with air more steadily and then enter the gas-solid rotary reactor for gas-solid reaction.

According to the present invention, in a preferred embodiment, the green, safe and environmentally-friendly production equipment of a formaldehyde-free water-based adhesive includes a polymerization reaction system, a solvent recovery system, and an ammonization reaction system.

The polymerization reaction system includes a maleic anhydride measuring tank, a styrene measuring tank, a diene monomer measuring tank, a solvent measuring tank, a recovered solvent tank, a dissolving and mixing kettle, a charging pump, a preheater, a tubular reactor, a curing kettle, a curing kettle condenser, and a circulating pump, charging ports of the maleic anhydride measuring tank, the styrene measuring tank, the diene monomer measuring tank, the solvent measuring tank, the recovered solvent tank are all communicated with a charging port of the dissolving and mixing kettle, a discharging port of the dissolving and mixing kettle is communicated with a charging port at the bottom of the preheater through the charging pump, a discharging port at the top of the preheater is communicated with a charging port of the tubular reactor, a discharging port of the tubular reactor is communicated with a charging port of the curing kettle, the curing kettle condenser is located above the curing kettle, a discharging port at the bottom of the curing kettle is communicated with the charging port at the bottom of the preheater through the circulating pump, and the preheater, the tubular reactor, the curing kettle, and the circulating pump form a circular reaction loop.

The solvent recovery system includes a discharging pump, a charging kettle, a charging kettle condenser, a measuring pump, a spray drying tower, a primary cyclone separator, a secondary cyclone separator, an induced draft fan, a spray washing tower, a spray washing tower circulating pump, a spray washing tower heat exchanger, a condenser, a gas-liquid separator, a recovered solvent pump, an air blower, a steam heater, and an electrical heater, a charging port at the top of the charging kettle is communicated with the discharging port at the bottom of the curing kettle through the discharging pump, the charging kettle condenser is located above the charging kettle, a discharging port at the bottom of the charging kettle is communicated with a liquid charging port at the top of the spray drying tower through the measuring pump, a gas discharging port of the spray drying tower is communicated with a gas charging port of the primary cyclone separator, a gas discharging port of the primary cyclone separator is communicated with a gas charging port of the secondary cyclone separator, a gas discharging port of the secondary cyclone separator is communicated with a gas charging port of the spray washing tower through the induced draft fan, a discharging port at the bottom of the spray washing tower is communicated with a liquid charging port at the side top of the spray washing tower through the spray washing tower circulating pump and the spray washing tower heat exchanger to form a circular absorption loop, a pipeline between the spray washing tower circulating pump and the spray washing tower heat exchanger is communicated with a charging port of the solvent measuring tank, a gas discharging port of the spray washing tower is communicated with a charging port of the gas-liquid separator through the condenser, a liquid discharging port at a lower end of the gas-liquid separator is communicated with a charging port of the recovered solvent tank through the recovered solvent pump, a gas discharging port at an upper end of the gas-liquid separator is communicated with an air inlet of the steam heater through the air blower, an air outlet of the steam heater is communicated with an air inlet of the electrical heater, an air outlet of the electrical heater is communicated with a gas charging port of the spray drying tower; a pipeline connecting the gas-liquid separator and the air blower is connected with an external vent valve pipeline, and a pipeline connecting the air blower and the steam heater is connected with an external $N_2$ valve pipeline.

The ammonization reaction system includes a charging screw, a gas-solid rotary reactor, a liquid ammonia measuring tank, a liquid ammonia evaporator, a liquid ammonia buffer tank, an air filter, a discharging screw, a product tank, a dust removal filter, an exhaust fan, a spray tower, a spray tower circulating pump, a spray tower heat exchanger, and a liquid adhesive reaction kettle, the charging screw is communicated with a solid charging port of the gas-solid rotary reactor, one end of the discharging screw is communicated with a solid discharging port of the gas-solid rotary reactor, the other end of the discharging screw is communicated with a charging port of the product tank, a discharging port of the liquid ammonia measuring tank is communicated with a charging port of the liquid ammonia buffer tank through the liquid ammonia evaporator, a discharging port of the liquid ammonia buffer tank is communicated with a gas charging port of the gas-solid rotary reactor, an air outlet of the gas-solid rotary reactor is communicated with an air inlet of the spray tower through the dust removal filter and the exhaust fan, and a discharging port at the bottom of the spray tower is communicated with a liquid charging port at the side top of the spray tower through the spray tower circulating pump and the spray tower heat exchanger to form a circular absorption loop. A pipeline between the spray tower heat exchanger and the spray tower circulating pump is communicated with a liquid charging port of the liquid adhesive reaction kettle; and an air outlet at the top of the spray tower is communicated with a falling film absorption tower unit, one end of the falling film absorption tower unit is connected with the spray tower, and the other end of the falling film absorption tower unit is connected with a water absorption tower.

According to the present invention, preferably, the falling film absorption tower unit is 2 falling film absorption towers that are connected in series, including a primary falling film absorption tower, a primary ammonia water pump, a secondary falling film absorption tower, and a secondary ammonia water pump, the air outlet at the top of the spray tower is communicated with a gas charging port at the top of the primary falling film absorption tower, the bottom of the primary falling film absorption tower is communicated with a liquid charging port at the top of the primary falling film absorption tower through the primary ammonia water pump to form a circular absorption loop; a pipeline between the primary ammonia water pump and the liquid charging port at the top of primary falling film absorption tower is communicated with the liquid charging port at the side top of the spray tower; an air outlet of a gas-liquid separator at a middle part of the primary falling film absorption tower is communicated with a charging port at the top of the secondary falling film absorption tower, a liquid inlet of a liquid storage tank at a lower part of the primary falling film absorption tower is communicated with a pipeline between the secondary ammonia water pump and a liquid charging port at the top of the secondary falling film absorption tower; the bottom of the secondary falling film absorption tower is communicated with the liquid charging port at the top of the secondary falling film absorption tower through the secondary ammonia water pump to form a circular absorption loop; an air outlet of a gas-liquid separator at a middle part of the secondary falling film absorption tower is communicated with a gas charging port at a middle part of the water absorption tower, and a liquid storage tank at a lower part of the secondary falling film absorption tower is communicated with a pipeline between a water absorption tower circulating pump and a liquid charging port at the top of the water absorption tower.

According to the present invention, preferably, the bottom of the water absorption tower is communicated with the liquid charging port at the top of the water absorption tower through the water absorption tower circulating pump to form a circulation loop. The top of the water absorption tower is connected with an external vent pipeline, and a liquid inlet at the side top of the water absorption tower is communicated with a tap water pipeline.

According to the present invention, preferably, the maleic anhydride measuring tank, the dissolving and mixing kettle, the curing kettle, and the charging kettle are all provided with a jacket, and hot water is injected into the jacket for heating.

According to the present invention, the falling film absorption towers and the ammonia water pumps form a circular absorption loop, and the water absorption tower and the water absorption tower circulating pump form a circular absorption loop. The primary and secondary falling film absorption towers and the water absorption tower are connected in series to ensure full absorption of ammonia gas so as to avoid environmental pollution caused by ammonia gas overflow.

According to the present invention, preferably, the liquid collection tanks at the lower parts of the falling film absorption towers and the water absorption tower are all provided with a liquid level meter.

A green, safe and environmentally-friendly production method for industrialized continuous large-scale production of a formaldehyde-free water-based adhesive adopting the above equipment includes the following steps:

1) Polymerization Reaction measuring and adding, by the solvent measuring tank or the recovered solvent tank, a solvent to the dissolving and mixing kettle, turning on the dissolving and mixing kettle for stirring, injecting hot water into the jacket for heating, measuring and adding, by the measuring tanks, maleic anhydride, a diene monomer, and styrene in sequence to the dissolving and mixing kettle, measuring and adding dibenzoyl peroxide serving as an initiator to the dissolving and mixing kettle via the solid charging port, outputting, by the charging pump, the mixed materials to the circular reaction loop system formed by the preheater, the tubular reactor, the curing kettle, and the circulating pump for polymerization reaction after the mixed materials are dissolved, and conveying, by the discharging pump, the reaction mixture to the charging kettle after the reaction is completed;

2) Solvent Recovery turning on the air blower, allowing a carrier gas to enter the spray drying tower via the gas charging port after the carrier gas is heated by the steam heater and the electrical heater, outputting, by the measuring pump, the material in the charging kettle to the spray drying tower via the liquid charging port at the same time, rapidly vaporizing the liquid to obtain solid powder that is a polymer intermediate, allowing the polymer intermediate to enter the spray drying tower receiving tank, and transferring the polymer intermediate to the ammonization reaction system; and allowing vaporized components (mainly the solvent) and a carrier gas carrying a small amount of dust in the spray drying tower to enter the primary cyclone separator and the secondary cyclone separator in sequence, allowing produced solid particles to enter the primary cyclone separator receiving tank and the secondary cyclone separator tank that are located below, respectively, conveying, by the induced draft fan, a cyclone-separated gas to the spray washing tower for spray washing (using a recovered solvent as a spray washing solution), outputting, by the spray washing tower circulating pump, a partial washing condensate to the solvent measuring tank for indiscriminate use, allowing the residual gas to enter the gas-liquid separator for gas-liquid separation after the residual gas is condensed by circulating water in the condenser, conveying, by the recovered solvent pump, a separated liquid to the recovered solvent tank for indiscriminate use, and returning the gas to the solvent recovery system for recycling;

3) Ammonization Reaction adopting a gas-solid continuous ammonization process of a powdery material, continuously conveying, by the charging screw, the polymer intermediate (solid) to the gas-solid rotary reactor, allowing liquid ammonia in the liquid ammonia measuring tank to enter the liquid ammonia buffer tank after the liquid ammonia is indirectly heated and vaporized by hot water in the liquid ammonia evaporator, continuously inputting, by an ammonia gas flow controller, ammonia gas to the gas-solid rotary reactor via the gas charging port, continuously inputting, by an air flow controller, air to the gas-solid rotary reactor via the gas charging port at the same time after the air is filtered by the air filter, adjusting injection speeds and proportions of the ammonia gas and the air, diluting the ammonia gas with the air to control the ammonia concentration to be less than or equal to 25% of the lower explosive limit, diluting and removing ammonization reaction heat with the air at the same time to solve the removal problem of reaction heat of the gas-solid reaction and ensure the stability and safety of the reaction, continuously conveying, by the discharging screw, a reaction product to the product tank, and discharging and packaging the reaction product to obtain a solid formaldehyde-free water-based adhesive product; and filtering, by the dust removal filter located above the gas-solid rotary reactor, reaction exhaust that includes unreacted ammonia gas to remove dust, introducing, by the exhaust fan, the filtered reaction exhaust into the spray tower for spray absorption (using ammonia water at a low concentration obtained by primary falling film absorption as an absorption solution), pumping, by the spray tower circulating pump, ammonia water produced by absorption to the liquid adhesive reaction kettle, reacting the ammonia water with the polymer intermediate to obtain a liquid formaldehyde-free water-based adhesive product; absorbing, by the primary falling film absorption tower, the secondary falling film absorption tower, and water in the water absorption tower in sequence, the residual exhaust in the spray tower to obtain ammonia water, emptying the ammonia water; continuously inputting, by the external tap water pipeline connected with the water adsorption tower, absorption supplementary water, and continuously outputting, by the primary ammonia water pump, ammonia water obtained by absorption to the spray tower for spray absorption.

According to the present invention, preferably, at step 1), the polymerization reaction temperature is 60-90° C.;

preferably, the diene monomer is one or two of divinylbenzene and dicyclopentadiene;

preferably, the solvent is one or two of isopropyl acetate, isoamyl acetate, and ethyl butyrate; and preferably, a molar ratio of the styrene to the maleic anhydride is (0.1-1):1; a molar ratio of the diene monomer to the maleic anhydride is (0.1-1):1; a mass ratio of the solvent to the maleic anhydride is (1-10):1; and an addition proportion of the dibenzoyl peroxide is 0.5-3 wt %.

According to the present invention, preferably, at step 2), the used carrier gas is $N_2$ or $CO_2$, an inert gas $N_2$ or $CO_2$ circulation spray draying process is adopted to reduce the partial pressure of solvent vaporization and the boiling point of the solvent so as to reduce the heat consumption of evaporation required for solvent recovery and reduce the energy consumption of solvent recovery. Furthermore, only $N_2$ or $CO_2$ overflows from the system, solvent loss is reduced, and emissions of VOCs are reduced, which is conducive to environmental protection. A large amount of inert gas $N_2$ or $CO_2$ is used for protection, and an explosion caused by the oxygen content reaching the explosive limit during solvent vaporization is avoided, which is conducive to security.

According to the present invention, preferably, at step 3), the ammonization process is operated under micro-negative pressure to avoid environmental pollution caused by ammonia gas overflow.

According to the present invention, the concentration of the ammonia gas is 1-4 vol %, and preferably, 2-3 vol %; and the concentration of the ammonia water is 1-10 wt %, and preferably, 3-6 wt %.

The reaction equipment of the present invention is applicable to continuous large-scale production of a formaldehyde-free water-based adhesive, the polymerization reaction process, the reaction raw materials, and the reaction conditions are applicable to the existing reaction process of a formaldehyde-free water-based adhesive. For example, the polymerization reaction process of an adhesive disclosed in CN112852357A.

In the present invention, the polymerization reaction system preferably adopts a circulation loop technique, and the preheater, the tubular reactor, the curing kettle, and the circulating pump form a circulation reaction loop, which can effectively remove reaction heat. Further preferably, the tubular reactor is arranged by connecting 2- to 10-stage tubular reactors in series.

In a case that maleic anhydride, a diene monomer, and styrene are used as reaction raw materials, a polymerization reaction formula is as follows:

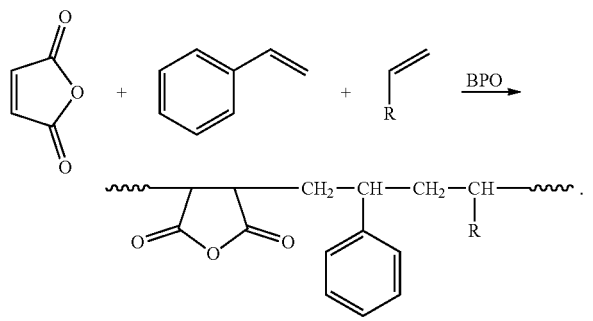

According to the present invention, the solvent recovery system is provided with the spray drying tower in which solvent recovery is performed. During the polymerization reaction, with the progress of the polymerization, a high-molecular-weight polymer intermediate is precipitated in the form of solid particles, and a low-molecular-weight polymer is still present in the form of liquid or viscous substance. The existing separation methods using a centrifuge or a filter produce a large amount of mixed solution, which is stressful for separation and recovery. Meanwhile, a centrifuged mother solution contains a considerable proportion of low-molecular-weight polymer that cannot be reused, resulting in production of a large amount of hazardous waste. The present invention adopts inert gas spray drying to uniformly disperse and attach a low-molecular-weight polymer generated during the polymerization reaction to high-molecular-weight polymer solid particles precipitated during the polymerization reaction, thereby solving the recovery and separation problem of a low-molecular-weight polymer and a reaction solvent, and solving the separation application problem of a solid polymerization product and a low-molecular-weight liquid polymerization product of polymerization reaction.

The solvent recovery system is provided with the steam heater and the electrical heater, is connected with the inert carrier gas pipeline, and adopts inert gas $N_2$ or $CO_2$ circulation spray drying to reduce the partial pressure of solvent vaporization and the boiling point of a solvent so as to reduce the heat consumption of evaporation required for solvent recovery and reduce the energy consumption of solvent recovery. Furthermore, only $N_2$ or $CO_2$ overflows from the system, solvent loss is reduced, emissions of VOCs are reduced, which is conducive to environmental protection. A large amount of inert gas $N_2$ or $CO_2$ is used for protection, and an explosion caused by the oxygen content reaching the explosive limit during solvent vaporization is avoided, which is conducive to security.

According to the present invention, the ammonization reaction system adopts the gas-solid rotary reactor in which a gas-solid continuous ammonization reaction is performed, and is provided with the air filter and the liquid ammonia measuring tank, air and ammonia gas are continuously injected into the gas-solid rotary reactor, the air dilutes the ammonia gas to control the concentration of the ammonia gas to be less than or equal to 25% of the lower explosive limit. Meanwhile, a large amount of air dilutes and removes ammonization reaction heat, thereby solving the removal problem of reaction heat of the gas-solid reaction, and ensuring the stability and safety of the reaction.

According to the present invention, the ammonization reaction system may run under micro-negative pressure to avoid environmental pollution caused by ammonia gas overflow; and preferably, the ammonization reaction system is provided with the primary and secondary falling film absorption towers and the water absorption tower that are connected in series and configured to absorb redundant ammonia gas to ensure full absorption of ammonia gas and avoid environmental pollution caused by ammonia gas overflow; a liquid-solid reaction is performed on ammonia water obtained by absorbing ammonization reaction exhaust and a solid polymer intermediate obtained by polymerization reaction to produce a liquid formaldehyde-free water-based adhesive produce, thereby realizing closed-loop application of materials.

In a case that maleic anhydride, a diene monomer, and styrene are used as reaction raw materials, an ammonization reaction formula is as follows:

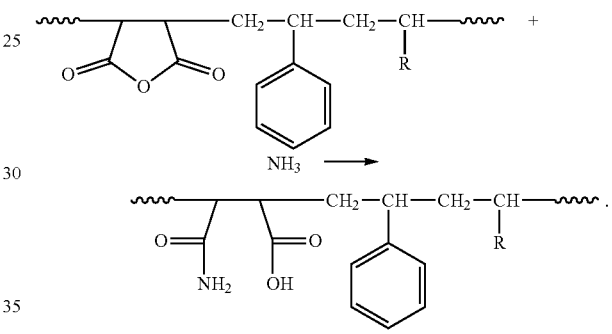

Those not described in detail in the present invention are all handled according to conventional techniques in the art.

The present invention has the following beneficial effects.

1. The polymerization reaction process of the present invention adopts a circulation loop technique, and the polymerization reaction is controlled by the tubular reactor to solve the problems of excessively high reaction speed in the initiating stage of the polymerization reaction, excessively high polymerization temperature, and difficult in-time removal of reaction heat, thereby avoiding explosive polymerization caused by overtemperature runaway of the polymerization reaction temperature. After rapidly reacting in the tubular reactor, materials are transferred to the curing kettle in which a molecular weight and a polymerization conversion rate of a polymer are further increased by increasing the polymerization residence time and raising the polymerization temperature, which is conducive to improvement of degree of crosslinking of a polymer intermediate, improvement of adhesive properties of an adhesive product, the full progress of the polymerization reaction, and the safety of the reaction.

2. According to the present invention, the inert gas $N_2$ or $CO_2$ circulation spray drying process is adopted to reduce the partial pressure of solvent vaporization, the boiling point of a solvent, and heat of evaporation so as to reduce the heat consumption of evaporation required for solvent recovery and reduce the energy consumption of solvent recovery. Furthermore, only $N_2$ or $CO_2$ overflows the system, solvent loss is reduced, and emissions of VOCs are reduced, which is conducive to environmental protection. A large amount of inert gas $N_2$ or $CO_2$ is used for protection, an explosion caused by the oxygen content reaching the explosive limit during solvent vaporization is avoided, which is conducive to security.

3. According to the present invention, spray drying is adopted to uniformly disperse and attach a low-molecular-weight polymer generated during the polymerization reaction to high-molecular-weight polymer solid particles precipitated during the polymerization reaction, thereby solving the recovery and separation problem of a low-molecular-weight liquid polymer and a reaction solvent, and solving the separation application problem of a solid polymerization product and a low-molecular-weight liquid polymerization product of polymerization reaction.

4. According to the present invention, the gas-solid continuous ammonization process of a powdery material is employed in ammonization reaction. Air and ammonia gas are continuously injected into the gas-solid reactor, the air dilutes the ammonia gas to control the concentration of the ammonia gas to be less than or equal to 25% of the lower explosive limit. Meanwhile, the air dilutes and removes ammonization reaction heat, thereby solving the removal problem of reaction heat of the gas-solid reaction, and ensuring the stability and safety of the reaction.

5. The ammonization process of the present invention is preferably performed under micro-negative pressure to avoid environmental pollution caused by ammonia gas overflow.

6. According to the present invention, the primary and secondary falling film absorption towers and the water absorption tower that are connected in series are provided to absorb ammonia reaction exhaust, thereby ensuring full absorption of ammonia gas, and avoiding environmental pollution caused by ammonia gas overflow. Meanwhile, a liquid-solid reaction is performed on ammonia water obtained by absorbing ammonia reaction exhaust and a polymerization reaction product to produce a liquid formaldehyde-free water-based adhesive product, thereby realizing closed-loop application of materials.

7. The green, safe and environmentally-friendly production process of a formaldehyde-free water-based adhesive provided in the present invention is green, safe, and environmentally-friendly, is easy to operate, has mild reaction conditions and good atom economy, can realize automatic control of the whole process, and is labor-saving, so it is suitable for industrialized continuous production of a formaldehyde-free water-based adhesive.

8. In the initiating stage of the polymerization reaction for an adhesive, if the polymerization reaction speed is too fast, the polymerization temperature is too high, and reaction heat is difficult to remove in time, explosive polymerization is easily caused by overtemperature runaway of the polymerization temperature, and therefore product quality and safety issues easily occur. The polymerization reaction system of the equipment of the present invention adopts a circulation loop technique, uses the tubular reactor to control the reaction, and removes reaction heat rapidly, which can avoid explosion caused by overtemperature of the polymerization reaction temperature. After rapidly reacting in the tubular reactor, materials are transferred to the curing kettle in which a molecular weight and a polymerization conversion rate of a polymer are further increased by increasing the polymerization residence time and raising the polymerization temperature, which is conducive to improvement of degree of crosslinking of a polymer intermediate, improvement of adhesive properties of an adhesive product, the full progress of the polymerization reaction, and the safety of the reaction.

9. The solvent recovery system of the present invention is provided with the steam heater and the electrical heater, is connected with the inert carrier gas pipeline, and adopts the inert gas $N_2$ or $CO_2$ circulation spray drying process to reduce the partial pressure of solvent vaporization, the boiling point of a solvent, and heat of evaporation so as to reduce the heat consumption of evaporation required by solvent recovery and reduce the energy consumption of solvent recovery. Furthermore, only $N_2$ or $CO_2$ overflows the system, solvent loss is reduced, and emissions of VOCs are reduced, which is conducive to environmental protection. A large amount of inert gas $N_2$ or $CO_2$ is used for protection, and an explosion caused by the oxygen content reaching the explosive limit during solvent vaporization is avoided, which is conducive to security.

10. The solvent recovery system of the present invention is provided with the spray drying tower in which solvent recovery is performed. Spray drying is adopted to uniformly disperse and attach a low-molecular-weight polymer generated during the polymerization reaction to high-molecular-weight polymer solid particles precipitated during the polymerization reaction, thereby solving the recovery and separation problem of a low-molecular-weight liquid polymer and a reaction solvent, and solving the separation application problem of a solid polymerization product and a low-molecular-weight liquid polymerization product of polymerization reaction.

11. The ammonization reaction system of the present invention adopts the gas-solid rotary reactor in which a gas-solid continuous ammonization reaction is performed, and is provided with the air filter and the liquid ammonia measuring tank. Air and ammonia gas are continuously injected into the gas-solid rotary reactor, the air dilutes the ammonia gas to control the concentration of the ammonia gas to be less than or equal to 25% of the lower explosive limit. Meanwhile, the air dilutes and removes ammonization reaction heat, thereby solving the removal problem of reaction heat of the gas-solid reaction, and ensuring the stability and safety of the reaction.

12. The ammonization reaction system of the present invention is provided with the primary and secondary falling film absorption towers and the water absorption tower that are connected in series and configured to absorb ammonization reaction exhaust to ensure full absorption of ammonia gas and avoid environmental pollution caused by ammonia gas overflow. Meanwhile, a liquid-solid reaction is performed on ammonia water obtained by absorbing ammonization reaction exhaust and a polymer intermediate to produce a liquid formaldehyde-free water-based adhesive product, thereby realizing closed-loop application of materials.

BRIEF DESCRIPTION OF THE DRAWINGS

FIG. 1 a schematic diagram of green, safe and environmentally-friendly production equipment of a formaldehyde-free water-based adhesive according to the present invention.

In the FIGURE, 1: maleic anhydride measuring tank, 2: styrene measuring tank, 3: diene monomer measuring tank, 4: solvent measuring tank, 5: recovered solvent tank, 6: dissolving and mixing kettle, 7: charging pump, 8: a preheater, 9: tubular reactor, 10: curing kettle, 11: curing kettle condenser, 12: circulating pump, 13: discharging pump, 14: charging kettle, 15: charging kettle condenser, 16: measuring pump, 17: spray drying tower, 18: spray drying tower receiving tank, 19: primary cyclone separator, 20: primary cyclone separator receiving tank, 21: secondary cyclone separator, 22: secondary cyclone separator receiving tank, 23: induced draft fan, 24: spray washing tower, 25: spray washing tower circulating pump, 26: spray washing tower heat exchanger, 27: condenser, 28: gas-liquid separator, 29: recovered solvent pump, 30: air blower, 31: steam heater, 32: electrical heater, 33: charging screw, 34: gas-solid rotary reactor, 35: liquid ammonia measuring tank, 36: liquid ammonia evaporator, 37: liquid ammonia buffer tank, 38: air filter, 39: discharging screw, 40: product tank, 41: dust removal filter, 42: exhaust fan, 43: spray tower, 44: spray tower circulating pump, 45: spray tower heat exchanger, 46: liquid adhesive reaction kettle, 47: primary falling film absorption tower, 48: primary ammonia water pump, 49: secondary falling film absorption tower, 50: secondary ammonia water pump, 51: water absorption tower, and 52: water adsorption tower circulating pump.

DETAILED DESCRIPTION OF THE EMBODIMENTS

In order to further understand the present invention, preferred embodiments of the present invention will be described below with reference to examples. However, it is to be understood that these descriptions are used for further describing the features and advantages of the present invention only, and are not intended to limit the claims of the present invention.

A green, safe and environmentally-friendly production process of a formaldehyde-free water-based adhesive includes:
 a polymerization reaction is performed on a monomer having a carbon-carbon unsaturated double bond and an acid anhydride group and at least one other monomer containing a carbon-carbon unsaturated double bond that serve as raw materials in the presence of a solvent and an initiator; and
 solid-liquid separation is performed on the polymerization reaction solution under the action of a high-temperature inert carrier gas, the solvent is vaporized, condensed, and recovered for indiscriminate use in polymerization reaction, and a gas-solid reaction is performed on the solid material serving as a polymer intermediate and a mixed gas of ammonia gas and air to obtain a solid formaldehyde-free water-based adhesive product.

According to the present invention, the green, safe and environmentally-friendly production process of a formaldehyde-free water-based adhesive includes polymerization reaction, solvent recovery, and ammonization reaction.

Polymerization Reaction:

According to the present invention, in a preferred embodiment, the monomer having a carbon-carbon unsaturated double bond and an acid anhydride group is monolene unsaturated dicarboxylic anhydride having 4 to 8 carbon atoms, and in a most preferred embodiment, the monomer is maleic anhydride.

According to the present invention, in a preferred embodiment, the other monomer containing a carbon-carbon unsaturated double bond is a diene monomer and/or monolene containing a benzene ring; in a further preferred embodiment, the diene monomer is at least one of divinylbenzene and dicyclopentadiene, and the monolene containing a benzene ring is styrene; and
 in a most preferred embodiment, maleic anhydride, the diene monomer, and styrene are used as reaction raw materials.

According to the present invention, in a preferred embodiment, the solvent is an ester solvent, and in a further preferred embodiment, the solvent is at least one of isopropyl acetate, isoamyl acetate, and ethyl butyrate.

According to the present invention, in a preferred embodiment, the initiator is a peroxide initiator, and in a further preferred embodiment, the initiator is dibenzoyl peroxide.

According to the present invention, in a preferred embodiment, a molar ratio of the monomer having a carbon-carbon unsaturated double bond and an acid anhydride group to the at least one other monomer containing a carbon-carbon unsaturated double bond is 1:(0.1-2);
 in a case that a monomer having a carbon-carbon unsaturated double bond and an acid anhydride group, a diene monomer, and monolene containing a benzene ring are used as reaction raw materials, a molar ratio of the monomer having a carbon-carbon unsaturated double bond and an acid anhydride group to the diene monomer to the monolene containing a benzene ring is 1:(0.1-1):(0.1-1); and
 in a most preferred embodiment, maleic anhydride, a diene monomer, and styrene are used as reaction raw materials in a molar ratio of 1:(0.1-1):(0.1-1).

According to the present invention, preferably, a mass ratio of the solvent to the monomer having a carbon-carbon unsaturated double bond and an acid anhydride group is (1-10):1.

According to the present invention, preferably, an addition amount of the initiator is 0.5-3% of the mass of the reaction raw materials.

According to the present invention, in a preferred embodiment, the reaction raw materials are dissolved in the solvent, and then a polymerization reaction is performed; and the preferable dissolving temperature is 30-60° C.

According to the present invention, in a preferred embodiment, the polymerization reaction process adopts a circulation loop reaction, and the preheater, the tubular reactor, the curing kettle, and the circulating pump form a circular reaction loop, which can effectively remove reaction heat. In a further preferred embodiment, the polymerization reaction is performed in the tubular reactor that is arranged by connecting 2- to 10-stage tubular reactors in series. Because the polymerization reaction is an exothermic reaction, in the early stage of the polymerization reaction, the reaction is relatively drastic, the tubular reactor combined with the circular reaction loop can not only effectively remove reaction heat, but also avoid explosion caused by the reaction. With the progress of the polymerization reaction, the reaction system becomes viscous, a macromolecular polymer intermediate is precipitated from the reaction system in the form of solid, and the reaction becomes slow. Therefore, the reaction system can be properly heated in the later stage of the reaction to accelerate the reaction.

According to the present invention, the polymerization reaction process, the reaction raw materials, and the reaction conditions are applicable to the existing reaction process of a formaldehyde-free water-based adhesive. For example, the polymerization reaction process of an adhesive disclosed in CN112852357A.

According to the present invention, in a case that maleic anhydride, a diene monomer, and styrene are used as reaction raw materials, a polymerization reaction formula is as follows:

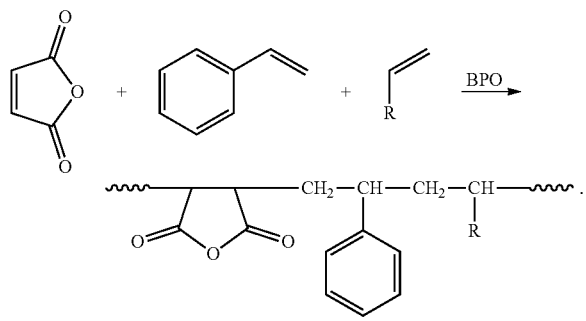

Solvent Recovery:

According to the present invention, in a preferred embodiment, solid-liquid separation is performed by spray drying. That is, solvent recovery can be performed in a spray dryer. During the polymerization reaction, with the progress of the polymerization, a high-molecular-weight polymer intermediate is precipitated in the form of solid particles, and a low-molecular-weight polymer is still in the form of liquid or viscous substance. The existing centrifugal separation method or filtration method produces a large amount of mixed solvent, which is stressful for separation and recovery. Meanwhile, a centrifuged mother solution contains a considerable proportion of low-molecular-weight polymer that cannot be reused, resulting in production of a large amount of hazardous waste. According to the present invention, inert gas spray drying is adopted to uniformly disperse and attach a low-molecular-weight polymer generated during the polymerization reaction to a high-molecular-weight polymer solid particles precipitated during the polymerization reaction, thereby solving the recovery and separation problem of a low-molecular-weight polymer and a reaction solvent, and solving the separation application problem of a solid polymerization product and a low-molecular-weight liquid polymerization product of polymerization reaction.

According to the present invention, in a preferred embodiment, a high-temperature insert gas $N_2$ or $CO_2$ circulation spray drying process is adopted, and the temperature of the high-temperature inert carrier gas is preferably 150-200° C. Such a process can reduce the partial pressure of solvent vaporization and the boiling point of a solvent so as to reduce the heat consumption of evaporation required for solvent recovery and reduce the energy consumption of solvent recovery. Furthermore, only $N_2$ or $CO_2$ overflows the system, solvent loss is reduced, and emissions of VOCs are reduced, which is conducive to environmental protection. A large amount of inert gas $N_2$ or $CO_2$ is used for protection, an explosion caused by the oxygen content reaching the explosive limit during solvent vaporization is avoided, which is conducive to security. After spray drying, the vaporized solvent is condensed and then recovered for indiscriminate use in polymerization reaction, an ammonization action is performed in the form of gas-solid reaction on the solid material serving as a polymer intermediate, no hazardous waste is generated in the whole process, so the process is safe and environmentally-friendly.

Ammonization Action:

According to the present invention, preferably, ammonization reaction adopts a gas-solid continuous ammonization process of a powdery material. A gas-solid ammonization reaction is performed on the polymer intermediate serving as a solid material and a mixed gas of air and ammonia gas that serves as a gas material. Air and ammonia gas are continuously injected into the gas-solid reactor, the air dilutes the ammonia gas to control the concentration of the ammonia gas to be less than or equal to 25% of the lower explosive limit. Meanwhile, a large amount of air dilutes and removes ammonization reaction heat, thereby solving the removal problem of reaction heat of the gas-solid reaction, and ensuring the stability and safety of the reaction. Preferably, in the gas-solid reaction system, the concentration of ammonia gas is 1-4 vol %, and further preferably, 2-3 vol %.

According to the present invention, preferably, the ammonization reaction process is operated under micro-negative pressure to avoid environmental pollution caused by ammonia gas overflow.

According to the present invention, in a preferred embodiment, after the gas-solid reaction is completed, a liquid-solid reaction is performed on ammonia water obtained by absorbing ammonization reaction exhaust and the solid polymer intermediate obtained by the polymerization reaction to produce a liquid formaldehyde-free water-based adhesive product, thereby realizing closed-loop application of materials. The concentration of ammonia water is preferably 1-10 wt %, and further preferably, 3-6 wt %. Preferably, the primary and secondary falling film absorption towers and the water absorption tower are connected in series to absorb redundant ammonia gas, thereby ensuring full absorption of ammonia gas, and avoiding environmental pollution caused by ammonia gas overflow.

According to the present invention, in a case that maleic anhydride, a diene monomer, and styrene are used as reaction raw materials, an ammonization reaction formula is as follows:

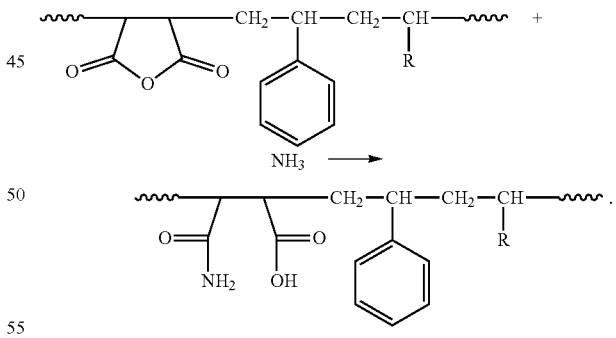

Example 1

A green, safe and environmentally-friendly production process of a formaldehyde-free water-based adhesive included the following steps:
(1) Polymerization Reaction
    maleic anhydride, styrene, divinylbenzene, a solvent, and dibenzoyl peroxide serving as an initiator were mixed and heated to 50° C. to be dissolved, after the materials were completely dissolved, a polymerization reaction was performed at the reaction temperature of 80° C., after the reaction was completed, the polymerization reaction solution entered the solvent recovery system; a molar ratio of the styrene to the maleic anhydride was 0.5:1, a molar ratio of the divinylbenzene to the maleic anhydride was 0.5:1, a mass ratio of the solvent to the maleic anhydride was 5:1, an addition proportion of the dibenzoyl peroxide was 1.5 wt %, the solvent was ethyl butyrate; the polymerization reaction was performed in a tubular reactor in a circulation loop, the preheater, the tubular reactor, the curing kettle, and the circulating pump formed a circular reaction loop, which could effectively remove reaction heat, and the tubular reactor was arranged by connecting 2- to 10-stage tubular reactors in series;

(2) Solvent Recovery solid-liquid separation was performed on the polymerization reaction solution by spray drying under the action of carrier gas $N_2$ at 180° C., the solvent was vaporized, condensed, and recovered for indiscriminate use in polymerization reaction, and an ammonization reaction was performed on the solid material serving as a polymer intermediate;

(3) Ammonization Reaction ammonia gas and air were injected into an ammonization reactor in a ratio, a gas-solid reaction was performed on the mixed gas and the polymer intermediate, the air diluted the ammonia gas to control the ammonia concentration to be 2-3 vol % that was less than 25% of the lower explosive limit, and meanwhile, the air diluted and removed ammonization reaction heat to solve the in-time removal problem of reaction heat of the gas-solid reaction, and a solid formaldehyde-free water-based adhesive product was obtained.

Example 2

A green, safe and environmentally-friendly production process of a formaldehyde-free water-based adhesive included the following steps:

(1) Polymerization Reaction maleic anhydride, styrene, divinylbenzene, a solvent, and dibenzoyl peroxide serving as an initiator were mixed and heated to 30° C. to be dissolved, after the materials were completely dissolved, a polymerization reaction was performed at the reaction temperature of 60° C., after the reaction was completed, the polymerization reaction solution entered the solvent recovery system; a molar ratio of the styrene to the maleic anhydride was 0.1:1, a molar ratio of the divinylbenzene to the maleic anhydride was 0.1:1, a mass ratio of the solvent to the maleic anhydride was 1:1, an addition proportion of the dibenzoyl peroxide was 0.5 wt %, and the solvent was isopropyl acetate;

(2) Solvent Recovery solid-liquid separation was performed on the polymerization reaction solution by spray drying under the action of carrier gas $N_2$ at 150° C., the solvent was vaporized, condensed, and recovered for indiscriminate use in polymerization reaction, and an ammonization reaction was performed on the solid material serving as a polymer intermediate;

(3) Ammonization Reaction ammonia gas and air were injected into an ammonization reactor in a ratio, a gas-solid reaction was performed on the mixed gas and the polymer intermediate, the air diluted the ammonia gas to control the ammonia concentration to be 1-2 vol % that was less than 25% of the lower explosive limit, and meanwhile, the air diluted and removed ammonization reaction heat to solve the in-time removal problem of reaction heat of the gas-solid reaction, and a solid formaldehyde-free water-based adhesive product was obtained.

Example 3

A green, safe and environmentally-friendly production process of a formaldehyde-free water-based adhesive included the following steps:

(1) Polymerization Reaction maleic anhydride, styrene, divinylbenzene, a solvent, and dibenzoyl peroxide serving as an initiator were mixed and heated to 60° C. to be dissolved, after the materials were completely dissolved, a polymerization reaction was performed at the reaction temperature of 100° C., after the reaction was completed, the polymerization reaction solution entered the solvent recovery system; a molar ratio of the styrene to the maleic anhydride was 1:1, a molar ratio of the divinylbenzene to the maleic anhydride was 1:1, a mass ratio of the solvent to the maleic anhydride was 10:1, an addition proportion of the dibenzoyl peroxide was 3 wt %, and the solvent was isoamyl acetate;

(2) Solvent Recovery solid-liquid separation was performed on the polymerization reaction solution by spray drying under the action of carrier gas $N_2$ at 200° C., the solvent was vaporized, condensed, and recovered for indiscriminate use in polymerization reaction, and an ammonization reaction was performed on the solid material serving as a polymer intermediate;

(3) Ammonization Reaction ammonia gas and air were injected into an ammonization reactor in a ratio, a gas-solid reaction was performed on the mixed gas and the polymer intermediate, the air diluted the ammonia gas to control the ammonia concentration to be 3-4 vol % that was less than 25% of the lower explosive limit, and meanwhile, the air diluted and removed ammonization reaction heat to solve the in-time removal problem of reaction heat of the gas-solid reaction, and a solid formaldehyde-free water-based adhesive product was obtained.

Example 4

A green, safe and environmentally-friendly production process of a formaldehyde-free water-based adhesive included the same steps as Example 1, and a difference was that:

at step (1), maleic anhydride, styrene, and dicyclopentadiene were used as reaction raw materials.

Example 5

A green, safe and environmentally-friendly production process of a formaldehyde-free water-based adhesive included the same steps as Example 1, and a difference was that:

at step (2), solid-liquid separation was performed on the polymerization reaction solution by spray drying under the action of carrier gas $CO_2$ at 150-200° C.

Example 6

A green, safe and environmentally-friendly production process of a formaldehyde-free water-based adhesive included the same steps as Example 1, and a difference was that:
at step (3), after the gas-solid reaction was completed, unreacted ammonia gas was absorbed with water, a liquid-solid reaction was performed on obtained ammonia water and the polymer intermediate to produce a liquid formaldehyde-free water-based adhesive product; and the concentration of ammonia water obtained by absorbing unreacted ammonia gas with water was 5 wt %.

Example 7

A green, safe and environmentally-friendly production process of a formaldehyde-free water-based adhesive included the same steps as Example 6, and a difference was that:
at step (3), after the gas-solid reaction was completed, redundant ammonia gas was absorbed by using the primary and second falling film absorption towers and the water absorption tower that were connected in series to ensure full absorption of ammonia gas and avoid environmental pollution caused by ammonia gas overflow. A liquid-solid reaction was performed on obtained ammonia water and the polymer intermediate to produce a liquid formaldehyde-free water-based adhesive product; and the concentration of ammonia water was 3 wt %.

Example 8

A green, safe and environmentally-friendly production process of a formaldehyde-free water-based adhesive included the same steps as Example 6, and a difference was that:
at step (3), after the gas-solid reaction was completed, redundant ammonia gas was absorbed by using the primary and second falling film absorption towers and the water absorption tower that were connected in series to ensure full absorption of ammonia gas and avoid environmental pollution caused by ammonia gas overflow. A liquid-solid reaction was performed on obtained ammonia water and the polymer intermediate to produce a liquid formaldehyde-free water-based adhesive product; and the concentration of ammonia water was 8 wt %.

Contrast

A production process included the same steps as Example 1, and a difference was that:
the polymerization reaction was performed in a conventional tank reactor intermittently, solvent recovery was performed by using a centrifuge to realize solid-liquid separation, a centrifuged solid was dried by using a dryer to obtain a polymer intermediate, a centrifuged liquid was distilled and recovered by using a conventional stirred tank, a solvent obtained by distillation was recovered for indiscriminate use, and the material at the bottom of the distillation still could not be used for producing an adhesive product through ammonization reaction, and was transferred and disposed as hazardous waste by a qualified unit, which caused waste and environmental pollution.

Test Example 1

Mass percentages of the reaction products and organic waste in the formaldehyde-free water-based adhesive products of Example 1 and Contrast are shown in Table 1.

TABLE 1

| No./item | % of reaction product | % of hazardous waste |
| --- | --- | --- |
| Example 1 | 100 | 0 |
| Contrast | 82 | 18 |

It can be known from Table 1 that the proportion of the reaction product in the formaldehyde-free water-based adhesive produced by the green, safe and environmentally-friendly production process of Example 1 can reach 100%, no hazardous waste is produced, atom economy is good, the efficiency is improved, and the production of hazardous waste is reduced, so the production process is more environmentally-friendly.

Test Example 2 Test for Limit of Harmful Substances

Harmful substances of the solid formaldehyde-free water-based adhesive products of Examples 1 to 3 (diluted in water to form a 25% aqueous solution) and the liquid formaldehyde-free water-based adhesive products of Examples 6 to 8 were tested by a method for testing limit of harmful substances of a water-based adhesive described in Indoor Decorating and Refurbishing materials—Limit of Harmful Substances of Adhesives (GB 18583-2008). Results are shown in Table 2 and Table 3 below.

TABLE 2

Test data of limit of harmful substances of solid formaldehyde-free water-based adhesive products (25% aqueous solution)

| Test item | Test index | Example 1 | Example 2 | Example 3 |
| --- | --- | --- | --- | --- |
| Free formaldehyde, g/kg | ≤1.0 | <0.5 (the minimum detectable mass concentration is 0.5 g/kg) | <0.5 (the minimum detectable mass concentration is 0.5 g/kg) | <0.5 (the minimum detectable mass concentration is 0.5 g/kg) |
| Benzene, g/kg | ≤0.20 | <0.02 (the minimum detectable mass concentration is 0.02 g/kg) | <0.02 (the minimum detectable mass concentration is 0.02 g/kg) | <0.02 (the minimum detectable mass concentration is 0.02 g/kg) |
| Toluene + xylene, g/kg | ≤10 | <0.02 (the minimum detectable mass | <0.02 (the minimum detectable mass | <0.02 (the minimum detectable mass |

TABLE 2-continued

Test data of limit of harmful substances of solid formaldehyde-
free water-based adhesive products (25% aqueous solution)

| Test item | Test index | Example 1 | Example 2 | Example 3 |
|---|---|---|---|---|
| | | concentration is 0.02 g/kg | concentration is 0.02 g/kg | concentration is 0.02 g/kg |
| Total volatile organic substances, g/L | ≤350 | 55 | 53 | 77 |

TABLE 3

Test data of limit of harmful substances of liquid
formaldehyde-free water-based adhesive products

| Test item | Test index | Example 6 | Example 7 | Example 8 |
|---|---|---|---|---|
| Free formaldehyde, g/kg | ≤1.0 | <0.5 (the minimum detectable mass concentration is 0.5 g/kg) | <0.5 (the minimum detectable mass concentration is 0.5 g/kg) | <0.5 (the minimum detectable mass concentration is 0.5 g/kg) |
| Benzene, g/kg | ≤0.20 | <0.02 (the minimum detectable mass concentration is 0.02 g/kg) | <0.02 (the minimum detectable mass concentration is 0.02 g/kg) | <0.02 (the minimum detectable mass concentration is 0.02 g/kg) |
| Toluene + xylene, g/kg | ≤10 | <0.02 (the minimum detectable mass concentration is 0.02 g/kg) | <0.02 (the minimum detectable mass concentration is 0.02 g/kg) | <0.02 (the minimum detectable mass concentration is 0.02 g/kg) |
| Total volatile organic substances, g/L | ≤350 | 47 | 58 | 46 |

The test data of the items of the solid formaldehyde-free water-based adhesive products of Examples 1 to 3 and the liquid formaldehyde-free water-based adhesive products of Examples 6 to 8 are all lower than the requirements for limit of harmful substances in the national standard. The data of free formaldehyde, benzene, and toluene+xylene are all lower than the minimum detectable limits.

Application Example 1

The solid formaldehyde-free water-based adhesive product of Example 1 was used for pressing preparation of plywood, and the steps were as follows:
1. preparation of a liquid water-based adhesive: the solid formaldehyde-free water-based adhesive product was added to water and uniformly dispersed by using a dispersion machine to form a glue with a solid content of 25%;
2. gluing: 6-8-year-old poplar was selected and cut in a rotary manner to obtain veneers with a thickness of about 2 cm, a four-roll gluing machine was used for gluing, glued veneers were assembled in a criss-cross manner along the grain direction to form a 5-layered (or 11-layered) slab;
3. pre-pressing: the assembled slab was transferred to a pre-press and pre-pressed under a pressure of 8-10 mpa at the room temperature for 1 h; and
4. hot-pressing: the pre-pressed slab was placed in a hot press and hot-pressed at the hot-pressing temperature of 160° C. under a pressure of 5-8 mpa for 30 min (1 h in a case of a 11-layered slab) to obtain plywood.

Application Example 2

As described in Application Example 1, the solid formaldehyde-free water-based adhesive product of Example 1 was used for pressing preparation of plywood, and differences were that: at step 1 of preparation of a liquid water-based adhesive, the solid formaldehyde-free water-based adhesive product was added to water and dispersed to form a glue with a solid content of 15%, flour (standard flour) was added to (a mass ratio of the standard flour to the glue was 1:4) and uniformly dispersed in the glue to obtain a glue for gluing; and at step 4 of hot-pressing, the hot-pressing temperature was 135° C.

Performance Test

The bonding strength of the plywood of Application Examples 1 and 2 was tested in accordance with Test Methods of Evaluating the Properties of Wood-based Panels and Surface Decorated Wood-based Panels (GB/T 17657-2013). Results are shown in Table 4 below.

TABLE 4

Performance test data

| Test item | Test standard (Type II panel) | Application Example 1 | Application Example 2 |
|---|---|---|---|
| Bonding strength/mpa | ≥0.7 | 1.44 | 1.20 |

Note:
the bonding strength values in the table are average values of test values of layers of plywood The bonding strength values of the plywood of Application Examples 1 and 2 are both greater than the index requirements for the bonding strength of the type II panel in the national standard GB/T 9846-2015.

Example 9

Green, safe and environmentally-friendly production equipment of a formaldehyde-free water-based adhesive includes a polymerization reaction system, a solvent recovery system, and an ammonization reaction system.

The polymerization reaction system includes raw material measuring tanks that are connected with a tubular reactor 9 through a dissolving and mixing kettle 6.

The solvent recovery system includes a spray drying tower 17, the tubular reactor 9 is connected with the spray drying tower 17 through a charging kettle 14; the top of the spray drying tower 17 is connected with a gas-liquid separator 28 through an electrical heater 32 and a steam heater 31, the bottom of the spray drying tower 17 is connected with a spray drying tower receiving tank 18; the steam heater 31 is also connected with an inert carrier gas pipeline, and the bottom of the gas-liquid separator 28 is connected with the raw material measuring tank 5 for circular indiscriminate use of a solvent.

The ammonization reaction system includes a gas-solid rotary reactor 34 provided with a charging screw 33, the spray drying tower receiving tank 18 is connected with the charging screw 33, the gas-solid rotary reactor 34 is connected with an air filter 38 and a liquid ammonia measuring tank 35, respectively; the gas-solid rotary reactor 34 is also provided with a discharging screw 39 that is connected with a product tank 40; the gas-solid rotary reactor 34 is also connected with a spray tower 43 through a dust removal filter 41 and an exhaust fan 42, the bottom of the spray tower 43 is connected with the top of the spray tower through a spray tower circulating pump 44 and a spray tower heat exchanger, and the spray tower circulating pump 44 is connected with a liquid adhesive reaction kettle 46.

Example 10

Differences between green, safe and environmentally-friendly production equipment of a formaldehyde-free water-based adhesive of the present example and the production equipment of Example 9 are as follows:
the raw material measuring tanks in the polymerization reaction system include a maleic anhydride measuring tank 1, a styrene measuring tank 2, a diene monomer measuring tank 3, a solvent measuring tank 4, and a recovered solvent tank 5 that are respectively connected with the dissolving and mixing kettle 6;
the dissolving and mixing kettle 6 in the polymerization reaction system is connected with the tubular reactor 9 through a charging pump 7 and a preheater 8, respectively. The preheater 8 is configured to preheat mixed raw materials in the dissolving and mixing kettle 6, which is more conducive to the polymerization reaction;
the tubular reactor 9 is arranged by connecting 2- to 10-stage tubular reactor in series. Multi-stage tubular reactors are connected in series, which is conducive to extension of the reaction residence time and is more conducive to full polymerization;
the tubular reactor 9 is connected with the charging kettle 14 through a curing kettle 10;
the curing kettle 10 is also connected with the preheater 8 through a circulating pump 12, and thus the preheater 8, the tubular reactor 9, the curing kettle 10, and the circulating pump 12 form a circular polymerization reaction loop, which is further conducive to control of the polymerization reaction speed in the initiating stage of the reaction, can effectively remove reaction heat, can further increase a molecular weight and a polymerization conversion rate of a polymer, and is conducive to improvement of adhesive properties of a polymerization product;
the curing kettle 10 is connected with the charging kettle 14 through a discharging pump 13; and
an upper part of the curing kettle 10 is provided with a curing kettle condenser 11, and an upper part of the charging kettle 14 is provided with a charging kettle condenser 15.

Example 11

Differences between green, safe and environmentally-friendly production equipment of a formaldehyde-free water-based adhesive of the present example and the production equipment of Example 10 are as follows:
in the solvent recovery system, the charging kettle 14 is connected with the spray drying tower 17 through a measuring pump 16;
the spray drying tower 17 is also connected with the gas-liquid separator 28 through a primary cyclone separator 19, a secondary cyclone separator 21, an induced draft fan 23, a spray washing tower 24, and a condenser 27, the gas-liquid separator 28 is connected with the steam heater 31 through an air blower 30; and according to such an arrangement, vaporized components (mainly a solvent) and an inert carrier gas carrying a small amount of dust in the spray drying tower 17 can pass through the primary cyclone separator 19 and the secondary cyclone separator 21 in sequence for separation of solid particles;
the primary cyclone separator 19 and the secondary cyclone separator 21 are respectively connected with a primary cyclone separator receiving tank 20 and a secondary cyclone separator receiving tank 22 that are configured to receive cyclone-separated solid particles; and
the bottom of the spray washing tower 24 is also connected with the top of the spray washing tower 24 through a spray washing tower circulating pump 25 and a spray washing tower heat exchanger 26, the spray washing tower circulating pump 25 is also connected with the solvent measuring tank 4; a cyclone-separated gas is conveyed by the induced draft fan 23 to the spray washing tower 24 for spray washing, a recovered solvent can be used as a spray washing solution, a partial washing condensate is outputted by the spray washing tower circulating pump 25 to the solvent measuring tank 4 for circular indiscriminate use, the residual gas enters the gas-liquid separator 28 for gas-liquid separation after being condensed by circulating water in the condenser 27.

Example 12

Differences between green, safe and environmentally-friendly production equipment of a formaldehyde-free water-based adhesive of the present example and the production equipment of Example 11 are as follows:

in the ammonization reaction system, the spray tower 43 is also connected with a water absorption tower 51 through a primary falling film absorption tower 47 and a secondary falling film absorption tower 49; the primary falling film absorption tower 47 is provided with a primary ammonia water pump 48, and the secondary falling film absorption tower 49 is provided with a secondary ammonia water pump 50 for circulating absorption; and in the ammonization reaction system, the liquid ammonia measuring tank 35 is connected with the gas-solid rotary reactor 34 through a liquid ammonia evaporator 36 and a liquid ammonia buffer tank 37; and according to such an arrangement, ammonia gas can be mixed with air more steadily and then enter the gas-solid rotary reactor 34 for gas-solid reaction.

Example 13

Green, safe and environmentally-friendly production equipment of a formaldehyde-free water-based adhesive includes a polymerization reaction system, a solvent recovery system, and an ammonization reaction system.

The polymerization reaction system includes a maleic anhydride measuring tank 1, a styrene measuring tank 2, a diene monomer measuring tank 3, a solvent measuring tank 4, a recovered solvent tank 5, a dissolving and mixing kettle 6, a charging pump 7, a preheater 8, a tubular reactor 9, a curing kettle 10, a curing kettle condenser 11, and a circulating pump 12, discharging ports of the maleic anhydride measuring tank 1, the styrene measuring tank 2, the diene monomer measuring tank 3, the solvent measuring tank 4, and the recovered solvent tank 5 are all communicated with a charging port of the dissolving and mixing kettle 6, a discharging pot of the dissolving and mixing kettle 6 is communicated with a charging port at the bottom of the preheater 8 through the charging pump 7, a discharging port at the top of the preheater 8 is communicated with a charging port of the tubular reactor 9, a discharging port of the tubular reactor 9 is communicated with a charging port of the curing kettle 10, the curing kettle condenser 11 is located above the curing kettle 10, a discharging port at the bottom of the curing kettle 10 is communicated with the charging port at the bottom of the preheater 8 through the circulating pump 12, and the preheater 8, the tubular reactor 9, the curing kettle 10, and the circulating pump 12 form a circular reaction loop.

The solvent recovery system includes a discharging pump 13, a charging kettle 14, a charging kettle condenser 15, a measuring pump 16, a spray drying tower 17, a primary cyclone separator 19, a secondary cyclone separator 21, an induced draft fan 23, a spray washing tower 24, a spray washing tower circulating pump 25, a spray washing tower heat exchanger 26, a condenser 27, a gas-liquid separator 28, a recovered solvent pump 29, an air blower 30, a steam heater 31, and an electrical heater 32, a charging port at the top of the charging kettle 14 is communicated with the discharging port at the bottom of the curing kettle 10 through the discharging pump 13, the charging kettle condenser 15 is located above the charging kettle 14, a discharging port at the bottom of the charging kettle 14 is communicated with a liquid charging port at the top of the spray drying tower 17 through the measuring pump 16, a gas discharging port of the spray drying tower 17 is communicated with a gas charging port of the primary cyclone separator 19, a gas discharging port of the primary cyclone separator 19 is communicated with a gas charging port of the secondary cyclone separator 21, a gas discharging port of the secondary cyclone separator 21 is communicated with a gas charging port of the spray washing tower 24 through the induced draft fan 23, a discharging port at the bottom of the spray washing tower 24 is communicated with a liquid charging port at the side top of the spray washing tower 24 through the spray washing tower circulating pump 25 and the spray washing tower heat exchanger 26 to form a circular absorption loop, a pipeline between the spray washing tower circulating pump 25 and the spray washing tower heat exchanger 26 is communicated with a charging port of the solvent measuring tank 4, a gas discharging port of the spray washing tower 24 is communicated with a charging port of the gas-liquid separator 28 through the condenser 27, a liquid discharging port at a lower end of the gas-liquid separator 28 is communicated with a charging port of the recovered solvent tank 5 through the recovered solvent pump 29, a gas discharging port at an upper end of the gas-liquid separator 28 is communicated with an air inlet of the steam heater 31 through the air blower 30, an air outlet of the steam heater 31 is communicated with an air inlet of the electrical heater 32, an air outlet of the electrical heater 32 is communicated with a gas charging port of the spray drying tower 17, a pipeline connecting the gas-liquid separator 28 and the air blower 30 is connected with an external vent valve pipeline, and a pipeline connecting the air blower 30 and the steam heater 31 is connected with an external $N_2$ valve pipeline.

The ammonization reaction system includes a charging screw 33, a gas-solid rotary reactor 34, a liquid ammonia measuring tank 35, a liquid ammonia evaporator 36, a liquid ammonia buffer tank 37, an air filter 38, a discharging screw 39, a product tank 40, a dust removal filter 41, an exhaust fan 42, a spray tower 43, a spray tower circulating pump 44, a spray tower heat exchanger 45, and a liquid adhesive reaction kettle 46, the charging screw 33 is communicated with a solid charging port of the gas-solid rotary reactor 34, one end of the discharging screw 39 is communicated with a solid discharging port of the gas-solid rotary reactor 34, the other end of the discharging screw 39 is communicated with a charging port of the product tank 40, a discharging port of the liquid ammonia measuring tank 35 is communicated with a charging port of the liquid ammonia buffer tank 37 through the liquid ammonia evaporator 36, a discharging port of the liquid ammonia buffer tank 37 is communicated with a gas charging port of the gas-solid rotary reactor 34, an air outlet of the gas-solid rotary reactor 34 is communicated with an air inlet of the spray tower 43 through the dust removal filter 41 and exhaust fan 42, and a discharging port at the bottom of the spray tower 43 is communicated with a liquid charging port at the side top of the spray tower 43 through the spray tower circulating pump 44 and the spray tower heat exchanger 45 to form a circular absorption loop. A pipeline between the spray tower heat exchanger 45 and the spray tower circulating pump 44 is communicated with a liquid charging port of the liquid adhesive reaction kettle 46.

In the present example, an air outlet at the top of the spray tower 43 is connected with a falling film absorption tower unit, one end of the falling film absorption tower unit is connected with the spray tower 43, and the other end of the falling film absorption tower unit is connected with a water absorption tower 51.

The falling film absorption tower unit is 2 falling film absorption towers that are connected in series, including a primary falling film absorption tower 47, a primary ammonia water pump 48, a secondary falling film absorption tower 49, and a secondary ammonia water pump 50, the air outlet at the top of the spray tower 43 is communicated with a gas charging port at the top of the primary falling film absorption tower 47, the bottom of the primary falling film absorption tower 47 is communicated with a liquid charging port at the top of the primary falling film absorption tower 47 through the primary ammonia water pump 48 to form a circular absorption loop; a pipeline between the primary ammonia water pump 48 and the liquid charging port at the top of the primary falling film absorption tower 47 is communicated with the liquid charging port at the side top of the spray tower 43; an air outlet of a gas-liquid separator at a middle part of the primary falling film absorption tower 47 is communicated with a charging port at the top of the secondary falling film absorption tower 49, a liquid charging port of a liquid storage tank at a lower part of the primary falling film absorption tower 47 is communicated with a pipeline between the secondary ammonia water pump 50 and a liquid charging port at the top of the secondary falling film absorption tower 49; the bottom of the secondary falling film absorption tower 49 is communicated with the liquid charging port at the top of the secondary falling film absorption tower 49 through the secondary ammonia water pump 50 to form a circular absorption loop; an air outlet of a gas-liquid separator at a middle part of the secondary falling film absorption tower 49 is communicated with a gas charging port at a middle part of the water absorption tower 51, a liquid storage tank at a lower part of the secondary falling film absorption tower 49 is communicated with a pipeline between a water absorption tower circulating pump 52 and a liquid charging port at the top of the water absorption tower 51; and the bottom of the water absorption tower 51 is communicated with the liquid charging port at the top of the water absorption tower 51 through the water absorption tower circulating pump 52 to form a circulation loop. The top of the water absorption tower 51 is connected with an external vent pipeline, and a liquid inlet at the side top of the water absorption tower 51 is connected with a tap water pipeline.

Example 14

Differences between green, safe and environmentally-friendly production equipment of a formaldehyde-free water-based adhesive of the present example and the production equipment of Example 13 are as follows:

the maleic anhydride measuring tank 1, the dissolving and mixing kettle 6, the curing kettle 10, and the charging kettle 14 are all provided with a jacket, and hot water is injected into the jacket for heating; the tubular reactor 9 is arranged by connecting 2- to 10-stage tubular reactors in series, lower parts of the spray drying tower 17, the primary cyclone separator 19, and the secondary cyclone separator 21 are respectively connected with a primary cyclone separator receiving tank 20 and a secondary cyclone separator receiving tank 22 that are configured to receive powdery materials, and the liquid storage tanks at the lower parts of the primary falling film absorption tower 47, the secondary falling film absorption tower 49, and the water absorption tower 51 are all provided with a liquid level meter.

Example 15

A green, safe and environmentally-friendly production method of a formaldehyde-free water-based adhesive using the equipment of Example 13 or 14 includes the following steps:

(1) Polymerization Reaction ethyl butyrate serving as a solvent is measured and added by the solvent measuring tank 4 or the recovered solvent tank 5 to the dissolving and mixing kettle 6, the dissolving and mixing kettle 6 is turned on for stirring, hot water at 30-60° C. is injected into the jacket for heating, maleic anhydride, divinylbenzene, and styrene are respectively measured and added by the measuring tanks in sequence to the dissolving and mixing kettle 6, dibenzoyl peroxide serving as an initiator is measured and added to the dissolving and mixing kettle 6 via the solid charging port; a molar ratio of the styrene to the maleic anhydride is (0.1-1):1, a molar ratio of the divinylbenzene to the maleic anhydride is (0.1-1):1, a mass ratio of the ethyl butyrate serving as a solvent to the maleic anhydride is (1-10):1, an addition proportion of the dibenzoyl peroxide is 0.5-3 wt %, after being dissolved, the mixed materials are outputted by the charging pump 7 to a circular reaction loop system formed by the preheater 8, the tubular reactor 9, the curing kettle 10, and the circulating pump 12 for polymerization reaction, the reaction temperature is 60-90° C., and after the reaction is completed, the reaction mixture is conveyed by the discharging pump 13 to the charging kettle 14;

(2) Solvent Recovery the air blower 30 is turned on, ammonia gas enters the spray drying tower 17 via the gas charging port after being heated by the steam heater 31 and the electrical heater 32, the material in the charging kettle 14 is outputted by the measuring pump 16 and enters the spay drying tower 17 via the liquid charging port at the same time, the liquid is rapidly vaporized to obtain solid powder that is a polymer intermediate, and the polymer intermediate enters the spray drying tower receiving tank 18 and then is transferred to the ammonization reaction system;

vaporized components (mainly the solvent) and nitrogen gas carrying a small amount of dust in the spray drying tower 17 enter the primary cyclone separator 19 and the secondary cyclone separator 21 in sequence, produced solid particles respectively enter the primary cyclone separator receiving tank 20 and the secondary cyclone separator receiving tank 22 that are located below, a cyclone-separated gas is conveyed by the induced draft fan 23 to the spray washing tower 24 for spray washing (a recovered solvent is used as a spray washing solution), a partial washing condensate is outputted by the spray washing tower circulating pump 25 to the solvent measuring tank 4 for indiscriminate use, the residual gas enters the gas-liquid separator 28 for gas-liquid separation after being condensed by circulating water in the condenser 27, a separated liquid is conveyed by the recovered solvent pump 29 to the recovered solvent tank 5 for indiscriminate use, and the gas is returned to the solvent recovery system for recycling;

(3) Ammonization Reaction a gas-solid continuous ammonization process of a powdery material is adopted, the polymer intermediate (solid) is continuously conveyed by the charging screw 33 to the gas-solid rotary reactor 34, liquid ammonia in the liquid ammonia measuring tank 35 enters the liquid ammonia buffer tank 37 after being indirectly heated and vaporized by hot water in the liquid ammonia evaporator 36, and is continuously inputted by an ammonia gas flow controller to the gas-solid rotary reactor 34 via the gas charging port, air is continuously inputted by an air flow controller to the gas-solid rotary reactor 34 via the gas charging port at the same time after being filtered by the air filter 38, injection speeds and proportions of the ammonia gas and the air are adjusted, the air dilutes the ammonia gas to control the ammonia concentration to be 2-3 vol % that is less than 25% of the lower explosive limit, and meanwhile, the air dilutes and removes ammonization reaction heat, thereby solving the removal problem of reaction heat of the gas-solid reaction, and ensuring the stability and safety of the reaction. A reaction product is continuously conveyed by the discharging screw 39 to the product tank 40, discharged, and packaged to obtain a solid formaldehyde-free water-based adhesive product.

Reaction exhaust that includes unreacted ammonia gas is filtered by the dust removal filter 41 located above the gas-solid rotary reactor 34 to remove dust, and introduced by the exhaust fan 42 into the spray tower 43 for spray absorption (ammonia water at a low concentration that is obtained by primary falling film absorption is used as an absorption solution), and ammonia water at a concentration of 3-6 wt % that is produced by absorption is pumped by the spray tower circulating pump 44 to the liquid formaldehyde-free adhesive reaction kettle 46, and reacts with the polymer intermediate to obtain a liquid formaldehyde-free water-based adhesive product. The residual exhaust in the spray tower 43 is absorbed by the primary falling film absorption tower 47, the secondary falling film absorption tower 49, and water in the water absorption tower 51 in sequence to obtain ammonia water, and the ammonia water is emptied; absorption supplementary water is continuously inputted by the external tap water pipeline connected with the water absorption tower 51, and ammonia water at a concentration of 3-6 wt % that is obtained by absorption is continuously outputted by the primary ammonia water pump 48 to the spray tower 43 for spray absorption.

Example 16

Differences between a green, safe and environmentally-friendly production method of a formaldehyde-free water-based adhesive using the equipment of Example 13 or 14 of the present example and the production method of Example 15 are as follows:
a solvent used in the polymerization reaction is isoamyl acetate, a diene monomer is dicyclopentadiene, and a carrier gas used in solvent recovery is $CO_2$.

Example 17

Differences between a green, safe and environmentally-friendly production method of a formaldehyde-free water-based adhesive using the equipment of Example 13 or 14 of the present example and the production method of Example 15 are as follows:
a solvent used in the polymerization reaction is a mixed solvent of isopropyl acetate and ethyl butyrate in a mass ratio of (0.3-1):1, and a diene monomer is dicyclopentadiene.

What is claimed is:
1. A green, safe and environmentally-friendly production process of a formaldehyde-free water-based adhesive, comprising:
performing a polymerization reaction on a monomer having a carbon-carbon unsaturated double bond and an acid anhydride group and at least one other monomer containing a carbon-carbon unsaturated double bond that serve as raw materials in the presence of a solvent and an initiator; and
performing solid-liquid separation on a polymerization reaction solution under the action of a high-temperature inert carrier gas, vaporizing, condensing, and recovering the solvent for indiscriminate use in polymerization reaction, and performing a gas-solid reaction on the solid material serving as a polymer intermediate and a mixed gas of ammonia gas and air to obtain a solid formaldehyde-free water-based adhesive product.

2. The green, safe and environmentally-friendly production process of a formaldehyde-free water-based adhesive according to claim 1, characterized in that the polymerization reaction is performed in a tubular reactor, wherein the tubular reactor in a circulation loop.

3. The green, safe and environmentally-friendly production process of a formaldehyde-free water-based adhesive according to claim 1, characterized in that the solid-liquid separation is performed by spray drying.

4. The green, safe and environmentally-friendly production process of a formaldehyde-free water-based adhesive according to claim 1, characterized in that the inert carrier gas is $N_2$ or $CO_2$.

5. The green, safe and environmentally-friendly production process of a formaldehyde-free water-based adhesive according to claim 1, characterized in that the temperature of the high-temperature inert carrier gas is 150-200° C.

6. The green, safe and environmentally-friendly production process of a formaldehyde-free water-based adhesive according to claim 1, characterized in that during the gas-solid reaction performed on the solid material serving as a polymer intermediate and the mixed gas of ammonia gas and air, the concentration of the ammonia gas is 1-4 vol %.

7. The green, safe and environmentally-friendly production process of a formaldehyde-free water-based adhesive according to claim 1, characterized in that after the gas-solid reaction is completed, unreacted ammonia gas is absorbed with water, and a liquid-solid reaction is performed on obtained ammonia water and the polymer intermediate to produce a liquid formaldehyde-free water-based adhesive product; and
the concentration of the ammonia water obtained by absorbing the unreacted ammonia gas with water is 1-10 wt %.

8. The green, safe and environmentally-friendly production process of a formaldehyde-free water-based adhesive according to claim 1, characterized in that the monomer having a carbon-carbon unsaturated double bond and an acid anhydride group, or having the carbon-carbon unsaturated double bond only; the monomer having the carbon-carbon unsaturated double bond and the acid anhydride group is monolene unsaturated dicarboxylic anhydride having 4 to 8 carbon atoms, and optionally, the monolene unsaturated dicarboxylic anhydride is maleic anhydride; and
the monomer having the carbon-carbon unsaturated double bond is a diene monomer and/or monolene containing a benzene ring; and, the diene monomer is divinylbenzene or dicyclopentadiene, and the monolene containing a benzene ring is styrene.

9. The green, safe and environmentally-friendly production process of a formaldehyde-free water-based adhesive according to claim 1, characterized in that the solvent is an ester solvent, and optionally, the ester solvent is selected form the group consisting of isopropyl acetate, isoamyl acetate, and ethyl butyrate; and
the initiator is a peroxide initiator.

10. The green, safe and environmentally-friendly production process of a formaldehyde-free water-based adhesive according to claim 1, characterized in that a molar ratio of the monomer having a carbon-carbon unsaturated double bond and an acid anhydride group to the at least one other monomer containing a carbon-carbon unsaturated double bond is 1:(0.1-2);

wherein the monomer having a carbon-carbon unsaturated double bond and an acid anhydride group, a diene monomer, and monolene containing a benzene ring are used as reaction raw materials, a molar ratio of the monomer having a carbon-carbon unsaturated double bond and an acid anhydride group to the diene monomer to the monolene containing a benzene ring is 1:(0.1-1):(0.1-1);

a mass ratio of the solvent to the monomer having a carbon-carbon unsaturated double bond and an acid anhydride group is (1-10): 1; and an addition amount of the initiator is 0.5-3% of the mass of the reaction raw materials.

11. A green, safe and environmentally-friendly production equipment for industrialized continuous large-scale production of a formaldehyde-free water-based adhesive, characterized by comprising a polymerization reaction system, a solvent recovery system, and an ammoniation reaction system, wherein the polymerization reaction system comprises raw material measuring tanks that are connected with a tubular reactor through a dissolving and mixing kettle;

the solvent recovery system comprises a spray drying tower, the tubular reactor is connected with the spray drying tower through a charging kettle; the top of the spray drying tower is connected with a gas-liquid separator through an electrical heater and a steam heater, the bottom of the spray drying tower is connected with a spray drying tower receiving tank; the steam heater is also connected with an inert carrier gas pipeline, and the bottom of the gas-liquid separator is connected with the raw material measuring tanks for circular indiscriminate use of a solvent; and the ammoniation reaction system comprises a gas-solid rotary reactor provided with a charging screw, the spray drying tower receiving tank is connected with the charging screw, the gas-solid rotary reactor is connected with an air filter and a liquid ammonia measuring tank, respectively; the gas-solid rotary reactor is also provided with a discharging screw that is connected with a product tank; the gas-solid rotary reactor is also connected with a spray tower through a dust removal filter and an exhaust fan, the bottom of the spray tower is connected with the top of the spray tower through a spray tower circulating pump and a spray tower heat exchanger, and the spray tower circulating pump is connected with a liquid adhesive reaction kettle.

12. The green, safe and environmentally-friendly production equipment for industrialized continuous large-scale production of a formaldehyde-free water-based adhesive according to claim 11, characterized in that in the polymerization reaction system, the raw material measuring tanks comprise a maleic anhydride measuring tank, a styrene measuring tank, a diene monomer measuring tank, a solvent measuring tank, and a recovered solvent tank that are respectively connected with the dissolving and mixing kettle.

13. The green, safe and environmentally-friendly production equipment for industrialized continuous large-scale production of a formaldehyde-free water-based adhesive according to claim 11, characterized in that in the polymerization reaction system, the dissolving and mixing kettle is connected with the tubular reactor through a charging pump and a preheater, respectively; and the tubular reactor is arranged by connecting 2- to 10-stage tubular reactors in series.

14. The green, safe and environmentally-friendly production equipment for industrialized continuous large-scale production of a formaldehyde-free water-based adhesive according to claim 11, characterized in that the tubular reactor is connected with the charging kettle through a curing kettle or a discharging pump;

optionally, the curing kettle is connected with the preheater through a circulating pump; and an upper part of the curing kettle is provided with a curing kettle condenser, and an upper part of the charging kettle is provided with a charging kettle condenser.

15. The green, safe and environmentally-friendly production equipment for industrialized continuous large-scale production of a formaldehyde-free water-based adhesive according to claim 14, characterized in that in the solvent recovery system, the charging kettle is connected with the spray drying tower through a measuring pump;

the spray drying tower is also connected with the gas-liquid separator through a primary cyclone separator, a secondary cyclone separator, an induced draft fan, a spray washing tower, and a condenser, and the gas-liquid separator is connected with the steam heater through an air blower;

the primary cyclone separator and the secondary cyclone separator are respectively connected with a primary cyclone separator receiving tank and a secondary cyclone separator receiving tank; and the bottom of the spray washing tower is also connected with the top of the spray washing tower through a spray washing tower circulating pump and a spray washing tower heat exchanger, and the spray washing tower circulating pump is also connected with the solvent measuring tank.

16. The green, safe and environmentally-friendly production equipment for industrialized continuous large-scale production of a formaldehyde-free water-based adhesive according to claim 11, characterized in that in the ammoniation reaction system, the spray tower is also connected with a water absorption tower through a primary falling film absorption tower and a secondary falling film absorption tower; the primary falling film absorption tower is provided with a primary ammonia water pump, and the secondary falling film absorption tower is provided with a secondary ammonia water pump.

17. The green, safe and environmentally-friendly production equipment for industrialized continuous large-scale production of a formaldehyde-free water-based adhesive according to claim 11, characterized in that in the ammoniation reaction system, the liquid ammonia measuring tank is connected with the gas-solid rotary reactor through a liquid ammonia evaporator and a liquid ammonia buffer tank.

18. A green, safe and environmentally-friendly production method for industrialized continuous large-scale production of a formaldehyde-free water-based adhesive, adopting the equipment according to claim 11, and comprising the following steps:

(1) polymerization reaction measuring and adding, by the solvent measuring tank or the recovered solvent tank, a solvent to the dissolving and mixing kettle, turning on the dissolving and mixing kettle for stirring, injecting hot water into a jacket for heating, measuring and adding, by the measuring tanks, maleic anhydride, a diene monomer, and styrene in sequence to the dissolving and mixing kettle, measuring and adding dibenzoyl peroxide serving as an initiator to the dissolving and mixing kettle via a solid charging port, outputting, by the charging pump, the mixed materials to a circular reaction loop system formed by the preheater, the tubular reactor, the curing kettle, and the circulating pump for polymerization reaction after the mixed materials are dissolved, and conveying, by the discharging pump, the reaction mixture to the charging kettle after the reaction is completed;

(2) solvent recovery turning on the air blower, allowing a carrier gas to enter the spray drying tower via a gas charging port after the carrier gas is heated by the steam heater and the electrical heater, outputting, by the measuring pump, the material in the charging kettle to the spray drying tower via a liquid charging port at the same time, rapidly vaporizing the liquid to obtain solid powder that is a polymer intermediate, allowing the polymer intermediate to enter the spray drying tower receiving tank, and transferring the polymer intermediate to the ammoniation reaction system; and allowing vaporized components and a carrier gas carrying a small amount of dust to enter the primary cyclone separator and the secondary cyclone separator in sequence, allowing produced solid particles to enter the primary cyclone separator receiving tank and the secondary cyclone separator receiving tank that are located below, respectively, conveying, by the induced draft fan, a cyclone-separated gas to the spray washing tower for spray washing, outputting, by the spray washing tower circulating pump, a partial washing condensate to the solvent measuring tank for indiscriminate use, allowing the residual gas to enter the gas-liquid separator for gas-liquid separation after the residual gas is condensed by circulating water in the condenser, conveying, by the recovered solvent pump, a separated liquid to the recovered solvent tank for indiscriminate use, and returning the gas to the solvent recovery system for recycling;

(3) ammoniation reaction adopting a gas-solid continuous ammoniation process of a powdery material, continuously conveying, by the charging screw, the polymer intermediate to the gas-solid rotary reactor, allowing liquid ammonia in the liquid ammonia measuring tank to enter the liquid ammonia buffer tank after being the liquid ammonia is indirectly heated and vaporized by hot water in liquid ammonia evaporator, continuously inputting, by an ammonia gas flow controller, ammonia gas to the gas-solid rotary reactor via a gas charging port, continuously inputting, by an air flow controller, air to the gas-solid rotary reactor via the gas charging port at the same time after the air is filtered by the air filter, adjusting injection speeds and proportions of the ammonia gas and the air, diluting the ammonia gas with the air to control the ammonia concentration to be less than or equal to 25% of the lower explosive limit, continuously conveying, by the discharging screw, a reaction product to the product tank, and discharging and packaging to obtain a solid formaldehyde-free water-based adhesive product; and introducing, by the exhaust fan, reaction exhaust into the spray tower for spray absorption after the reaction exhaust is filtered by the dust removal filter located above the gas-solid rotary reactor to remove dust, pumping, by the spray tower circulating pump, ammonia water obtained by absorption to the liquid adhesive reaction kettle, and reacting the ammonia water with the polymer intermediate to obtain a liquid formaldehyde-free water-based adhesive product.

19. The green, safe and environmentally-friendly production method for industrialized continuous large-scale production of a formaldehyde-free water-based adhesive according to claim 18, characterized in that at step (1), the polymerization reaction temperature is 60-90° C.;
the diene monomer is one or two of divinylbenzene and dicyclopentadiene;
the solvent is one or two of isopropyl acetate, isoamyl acetate, and ethyl butyrate; and
a molar ratio of the styrene to the maleic anhydride is (0.1-1):1; a molar ratio of the diene monomer to the maleic anhydride is (0.1-1):1; a mass ratio of the solvent to the maleic anhydride is (1-10):1; and an addition proportion of the dibenzoyl peroxide is 0.5-3 wt %; and
at step (2), the used carrier gas is $N_2$ or $CO_2$.

20. The green, safe and environmentally-friendly production method for industrialized continuous large-scale production of a formaldehyde-free water-based adhesive according to claim 18, characterized in that at step (3), the concentration of the ammonia gas is 1-4 vol %, and the concentration of the ammonia water is 1-10 wt %.

* * * * *